(12) United States Patent
Kuruma et al.

(10) Patent No.: US 11,055,210 B2
(45) Date of Patent: Jul. 6, 2021

(54) SOFTWARE TEST EQUIPMENT AND SOFTWARE TESTING METHOD

(71) Applicant: HITACHI, LTD., Tokyo (JP)

(72) Inventors: Hironobu Kuruma, Tokyo (JP); Hideto Ogawa, Tokyo (JP); Yuichiroh Nakagawa, Tokyo (JP); Shinji Itoh, Tokyo (JP); Naoto Sato, Tokyo (JP); Tomoyuki Myojin, Tokyo (JP)

(73) Assignee: HITACHI, LTD., Tokyo (JP)

( * ) Notice: Subject to any disclaimer, the term of this patent is extended or adjusted under 35 U.S.C. 154(b) by 62 days.

(21) Appl. No.: 16/129,141

(22) Filed: Sep. 12, 2018

(65) Prior Publication Data
US 2019/0121722 A1 Apr. 25, 2019

(30) Foreign Application Priority Data
Oct. 19, 2017 (JP) .............................. JP2017-202563

(51) Int. Cl.
*G06F 11/00* (2006.01)
*G06F 11/36* (2006.01)

(52) U.S. Cl.
CPC ...... *G06F 11/3688* (2013.01); *G06F 11/3664* (2013.01); *G06F 11/3696* (2013.01)

(58) Field of Classification Search
CPC .... G06F 11/22; G06F 11/362; G06F 11/3668; G06F 11/3688
See application file for complete search history.

(56) References Cited

U.S. PATENT DOCUMENTS

| 8,595,559 B2* | 11/2013 | Stewart | G06F 11/3692 |
| | | | 714/38.1 |
| 2006/0085681 A1* | 4/2006 | Feldstein | G06F 11/3684 |
| | | | 714/25 |

(Continued)

FOREIGN PATENT DOCUMENTS

| JP | 07-013809 A | 1/1995 |
| JP | 2006-518062 A | 8/2006 |
| JP | 2015-005189 A | 1/2015 |

OTHER PUBLICATIONS

Combined Search and Examination Report under Sections 17 and 18(3) dated Mar. 8, 2019 for GB Application No. GB1814758.7.

(Continued)

*Primary Examiner* — Duy Khuong T Nguyen
*Assistant Examiner* — Mohammad H Kabir
(74) *Attorney, Agent, or Firm* — Volpe Koenig

(57) ABSTRACT

Software test equipment including a data conversion unit receives test input data to convert the test input data into software input data to be provided to software and model input data, a software execution unit receives the software input data, executes the test target software based on the software input data, and outputs an execution result, a model execution unit receives a reference model for the software to generate a model allowable output value range of the execution result obtained by executing the software, based on the model input data and the reference model, a difference analysis unit generates difference information based on the execution result output by the software execution unit and the model allowable output value range generated by the model execution unit, and an evaluation unit receives evaluation criteria and evaluates the behavior of the software based on the difference information and the evaluation criteria.

11 Claims, 17 Drawing Sheets

(56) References Cited

U.S. PATENT DOCUMENTS

| | | |
|---|---|---|
| 2006/0230006 A1 | 10/2006 | Buscema |
| 2008/0168426 A1 | 7/2008 | Mitran et al. |
| 2011/0029957 A1 | 2/2011 | Shufer et al. |
| 2011/0145653 A1* | 6/2011 | Broadfoot ............ G06F 11/3604 714/38.1 |
| 2013/0007772 A1 | 1/2013 | Arcudi |
| 2014/0040666 A1 | 2/2014 | Goetz et al. |
| 2014/0282433 A1* | 9/2014 | Eilam ................. G06F 11/3676 717/131 |
| 2015/0301108 A1* | 10/2015 | Hamid ............. G01R 31/31813 714/724 |

OTHER PUBLICATIONS

Japanese Office Action dated Feb. 24, 2021 for Japanese Patent Application No. 2017-202563.

* cited by examiner

FIG. 3

301: REFERENCE MODEL = TRANSITION, {TRANSITION};

302: TRANSITION = STATE NAME "=" TRANSITION DESTINATION, {TRANSITION DESTINATION};

303: TRANSITION DESTINATION = CONDITIONAL TRANSITION DESTINATION | UNCONDITIONAL TRANSITION DESTINATION;

304: CONDITIONAL TRANSITION DESTINATION = "(" INPUT ")" [TRANSITION CONDITION] "(" [ALLOWABLE OUTPUT VALUE RANGE] ")" "->" STATE NAME;

305: UNCONDITIONAL TRANSITION = "->" STATE NAME;

306: INPUT = INPUT VARIABLE, {INPUT VARIABLE};

307: ALLOWABLE OUTPUT VALUE RANGE = OUTPUT VALUE, {OUTPUT VALUE};

308: STATE NAME = IDENTIFIER | START STATE;

FIG. 4

401: EVALUATION CRITERIA = WEIGHT DESIGNATION, {WEIGHT DESIGNATION};

402: WEIGHT DESIGNATION = TRANSITION ORIGIN STATE NAME "->" TRANSITION DESTINATION STATE NAME, "/", ERROR WEIGHT;

FIG. 5

501: SEQUENCE OF (INPUT NUMBER, (TRANSITION ORIGIN STATE NAME, TRANSITION DESTINATION STATE NAME, ALLOWABLE OUTPUT VALUE RANGE, NEXT STATE NAME))

FIG. 6

601: SEQUENCE OF (INPUT NUMBER, (TRANSITION ORIGIN STATE NAME, TRANSITION DESTINATION STATE NAME, NEXT STATE NAME, DIFFERENCE EVALUATION VALUE, SOFTWARE OUTPUT DATA VALUE))

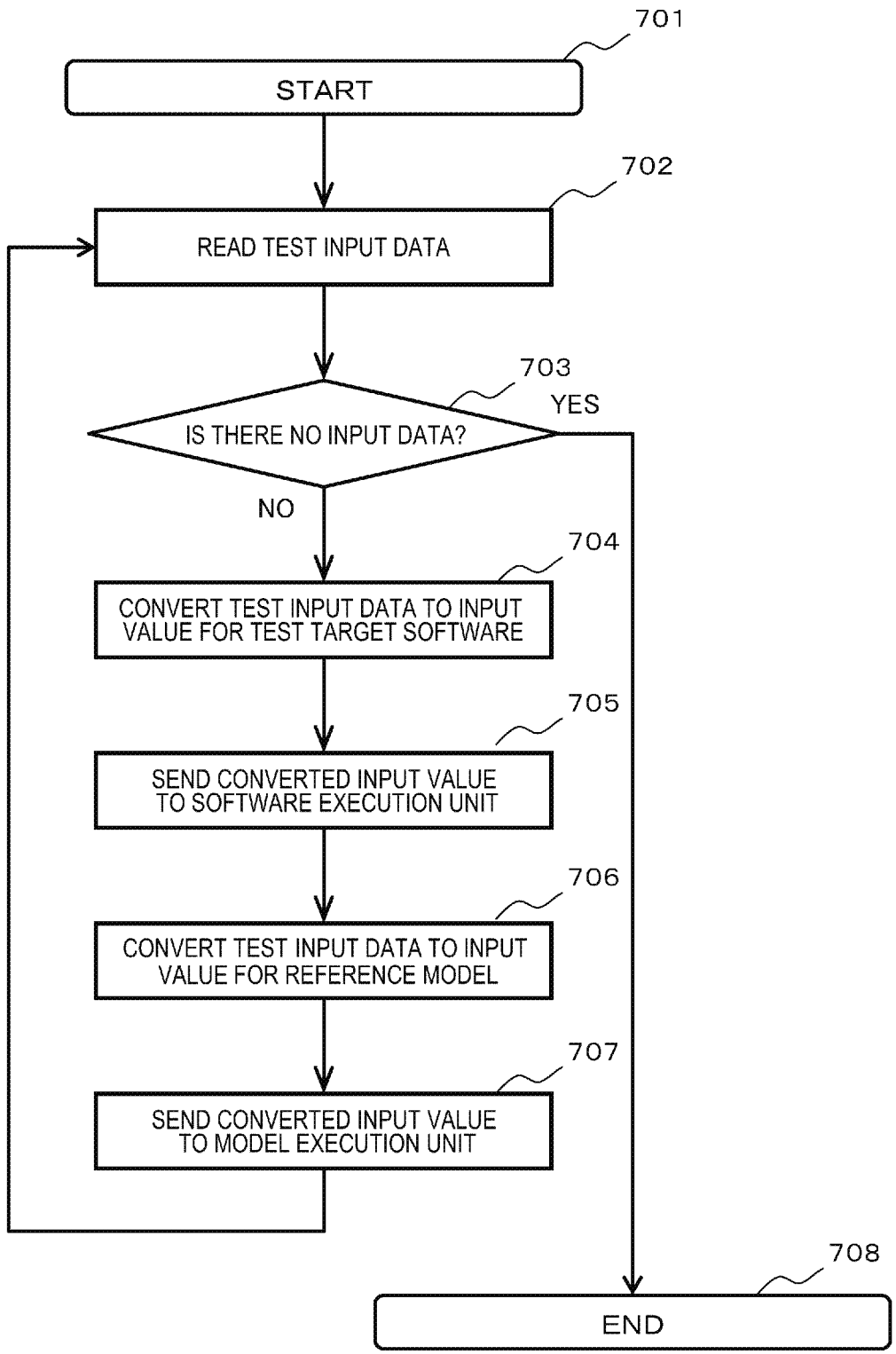

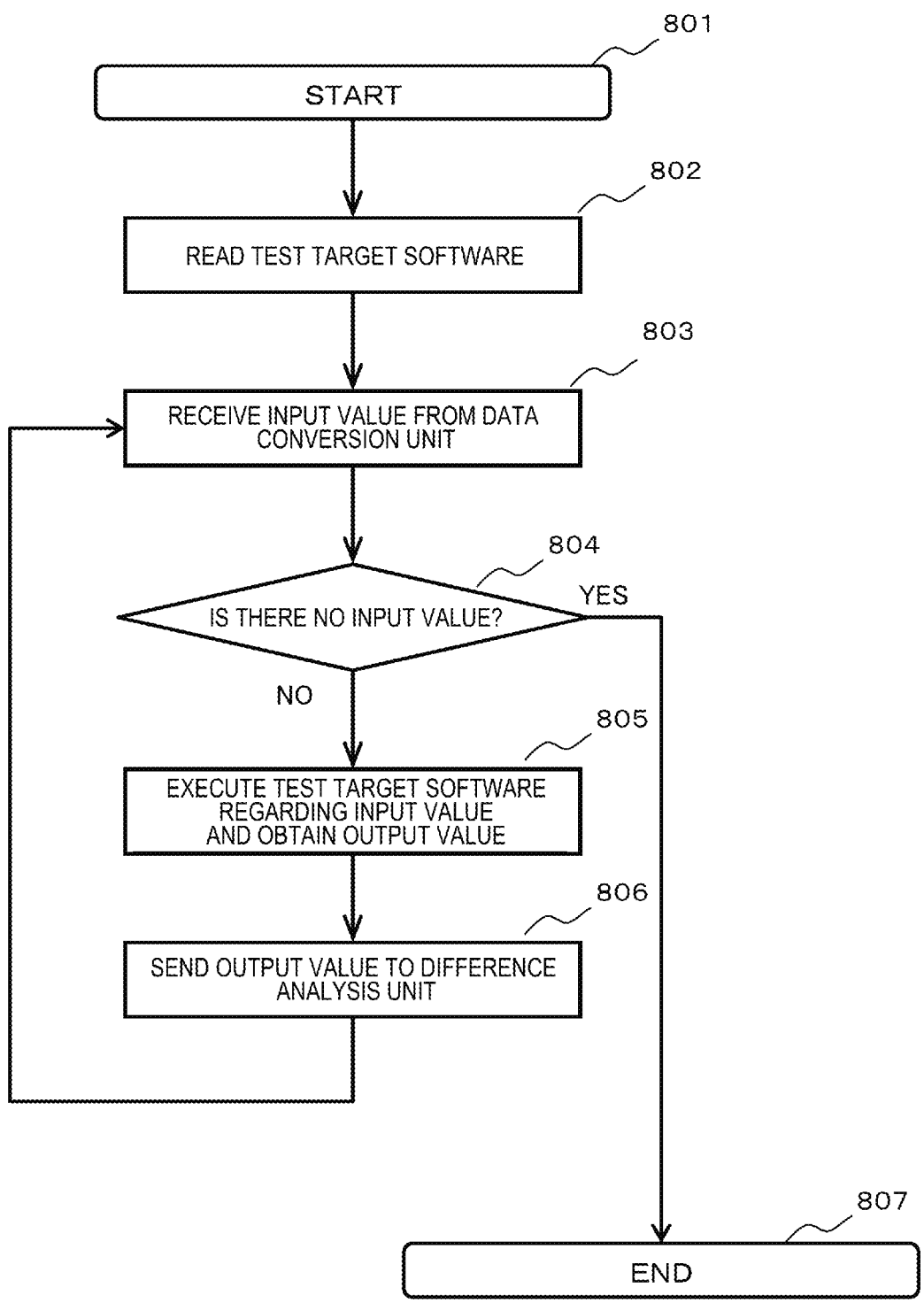

FIG. 16

| INPUT NUMBER (1601) | TEST INPUT DATA (1602) | SOFTWARE INPUT DATA (1603) | SOFTWARE OUTPUT DATA (1604) | MODEL INPUT DATA (1605) | ALLOWABLE OUTPUT VALUE RANGE (1606) |
|---|---|---|---|---|---|
| 1 | [motorcycle with ◇ o h markers] | [motorcycle] | L5 | o = 1.6, h = 10 | L1,L2,L3, L4,L5 |
| 2 | [car] | [car] | L1 | o = 7, h = 10 | L1,L2 |
| 3 | [small car] | [small car] | L5 | o = 3, h = 10 | L1,L2, L3,L4 |
| 4 | [motorcycle] | [motorcycle] | L3 | o = 4, h = 10 | L1,L2, L3, L4 |
| 5 | [car] | [car] | L2 | o = 8, h = 10 | L1,L2 |

FIG. 17

1701
FIRST REFERENCE MODEL
S0 = (o, h) o < h/5 (L1, L2, L3, L4, L5) -> S1
S1 = -> S0
S0 = (o, h) h/5 <= o < h/2 (L1, L2, L3, L4) -> S2
S2 = -> S0
S0 = (o, h) h/2 <= o (L1,L2) -> S3
S3 = -> S0

1702
FIRST EVALUATION CRITERIA
S0 -> S1 / 0.0
S0 -> S2 / 0.3
S0 -> S3 / 0.7

| TEST INPUT DATA 2001 | SOFTWARE OUTPUT DATA 2002 | FIRST MODEL INPUT VALUE 2003 | ALLOWABLE OUTPUT VALUE RANGE a 2004 | SECOND MODEL INPUT VALUE 2005 | ALLOWABLE OUTPUT VALUE RANGE b 2006 |
|---|---|---|---|---|---|
| (motorcycle with o, h, w labels) | L5 | o = 1.6<br>h = 10 | L1,L2,L3,L4,L5 | o = 1.6<br>w = 4.2 | L2,L4,L5 |
| (car) | L1 | o = 7<br>h = 10 | L1,L2 | o = 7<br>w = 8.2 | L1,L2,L3,L4,L5 |
| (small car) | L5 | o = 3<br>h = 10 | L1,L2,L3,L4 | o = 3<br>w = 3.5 | L1,L2,L3,L4,L5 |
| (motorcycle) | L3 | o = 4<br>h = 10 | L1,L2,L3,L4 | o = 4<br>w = 6.7 | L2,L4,L5 |
| (car) | L2 | o = 8<br>h = 10 | L1,L2 | o = 8<br>w = 9.7 | L1,L2,L3,L4,L5 |

SECOND REFERENCE MODEL
T0 = (o, w) o < w/2 (L2, L4, L5) -> T1
T1 = -> T0
T0 = (o, w)w/2 <= o (L1, L2, L3, L4, L5) -> T2
T2 = -> T0

2102

SECOND EVALUATION CRITERIA
T0 -> T1 / 0.5
T0 -> T2 / 0.5

FIG. 22

| | 2201 | 2202 | 2203 | 2204 | 2205 | 2206 |
|---|---|---|---|---|---|---|
| | INPUT NUMBER | TEST INPUT DATA | SOFTWARE INPUT DATA | SOFTWARE OUTPUT DATA | MODEL INPUT DATA | ALLOWABLE OUTPUT VALUE RANGE |
| | 1 | 1 | 1 | L1 | c | L1, L2 |
| | 2 | 9 | 9 | L9 | c = L1 | L9 |
| | 3 | 9 | 9 | L9 | c = L9 | L9 |
| | 4 | 0 | 0 | L0 | c = L9 | L0,L1,L2,L3,L4,L5,L6,L7,L8,L9 |

FIG. 23

THIRD REFERENCE MODEL
S0 = ( c ) (L1, L2) -> S1         2301
S1 = ( c ) c = L1 (L9) -> S2      2302
S2 = ( c ) c = L9 (L9) -> S3      2303
S3 = ( c ) c = L9 (L0,L1,L2,L3,L4,L5,L6,L7,L8,L9) -> S4   2304
S4 = -> S0                        2305
S1 = ( c ) c = L2 (L0) -> S5      2306
S5 = ( c ) c = L0 (L0) -> S6      2307
S6 = ( c ) c = L0 (L0,L1,L2,L3,L4,L5,L6,L7,L8,L9) -> S7   2308
S7 = -> S0                        2309

THIRD EVALUATION CRITERIA
S0 -> S1 / 1.0     S1 -> S2 / 1.0
S2 -> S3 / 1.0     S3 -> S4 / 1.0
S1 -> S5 / 1.0     S5 -> S6 / 1.0
S6 -> S7 / 1.0

FIG. 24
| INPUT NUMBER 2401 | TEST INPUT DATA 2402 | SOFTWARE INPUT DATA 2403 | SOFTWARE OUTPUT DATA 2404 | MODEL INPUT DATA 2405 | ALLOWABLE OUTPUT VALUE RANGE 2406 |
|---|---|---|---|---|---|
| 1 | 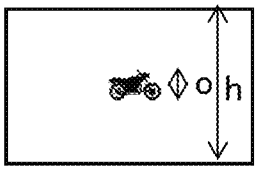 |  | L5 | o = 1.6<br>h = 10 | L1,L2,L3,<br>L4,L5 |
| 2 | 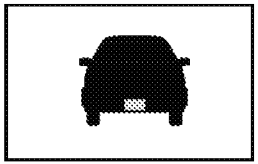 |  | L1 | o = 7<br>h = 10 | L1,L2 |
| 3 | 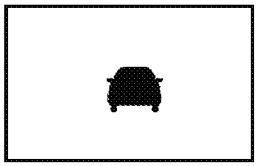 |  | L5 | o = 3<br>h = 10 | L1,L2,<br>L3,L4 |
| 4 | 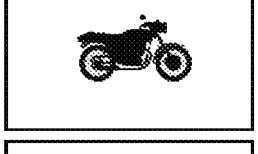 |  | L3 | o = 4<br>h = 10 | L1,L2,<br>L3, L4 |
| 5 | 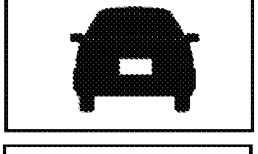 |  | L2 | o = 8<br>h = 10 | L1,L2 |
| 310 | 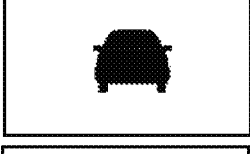 |  | L1 | o = 4<br>h = 10 | L1,L2,<br>L3,L4 |
| 311 | 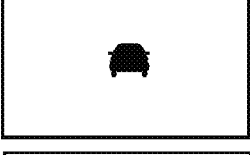 |  | L5 | o = 2<br>h = 10 | L1,L2,L3,<br>L4,L5 |
| 312 | 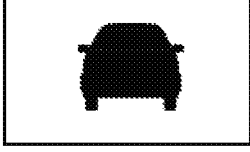 |  | L1 | o = 7<br>h = 10 | L1,L2 |

SOFTWARE TEST EQUIPMENT AND SOFTWARE TESTING METHOD

BACKGROUND OF THE INVENTION

1. Field of the Invention

The present invention relates to software test equipment and a software testing method, and more particularly, to software test equipment and a software testing method for testing software that has unpredictability in output data values with regard to input data values.

2. Description of Related Art

As the performance of information processing apparatuses is improved, computer systems are being demanded to operate in close connection with the real world. Processing targets include, for example, the following three items: (1) Collection of data from the real world using a plurality of sensors, (2) actions on the real world via a plurality of actuators, and (3) data mining for huge amounts of data. In such a system, a plurality of subsystems cooperate one another to process a large amount of complicatedly-correlated data. When designing software that operates in close connection with the real world, it is difficult for a designer to manually configure algorithms for processing a large amount of complicatedly-correlated data, unlike in the past. In order to solve this problem, software that uses an evaluation algorithm (artificial intelligence) generated through machine learning was also introduced. Generally, in "supervised learning" of machine learning, learning data set in which output values are given for input values is divided into a training data set and a testing data set, and the accuracy of learning by using the former is evaluated by using the latter.

The system disclosed in JP-T-2006-518062 provides an efficient learning method for generating evaluation algorithms through machine learning and a method of testing algorithms constituted by learning. In this system and method, a learning data set is divided into a training data set and a testing data set, and an evaluation algorithm (for example, an artificial neural network) is generated by using the training data set and a fitting score is evaluated by using the testing data set. Subsequently, a genetic algorithm is applied to data of these data sets so as to rearrange the data set, and a training data set and a testing data set corresponding to an optimum fitting score are generated from a common learning data set. As a result, a method of optimally dividing a learning data set is provided, thereby enabling an efficient learning with high accuracy.

As described in the Description of Related Art, as a plurality of subsystems cooperate with one another, for software constituting a system for processes a large amount of data which is complicatedly correlated, there is no designer capable of figuring out the overall behavior of the software, and output values for input values to the software cannot be clearly evaluated. Such software is software with unpredictability. In general, testing software is an action for verifying that output values expected when the software is designed are obtained with respect to input values. Therefore, whether software behaves as designed, that is, the reliability of the software can be checked through a test. However, with software with unpredictability, output values for input values cannot be determined when the software is designed, and thus tests cannot be sufficiently performed to confirm that the software behaves as expected.

In the technique of JP-T-2006-518062, an evaluation algorithm generated by machine learning is evaluated by a testing data set selected from a given learning data set. Therefore, input values and output values that can be used in software testing using the evaluation algorithm are also limited to the range of the given learning data set. This covers only some of input values such software is expected to process, thus being insufficient for a test for securing reliability of software. On the other hand, since a result of machine learning depends on learning, it is difficult to estimate output values for input values at the time of software design, and thus a test regarding input values not included in the given learning data set cannot be handled in the prior art. In order to secure the reliability of software having unpredictability whose output values with respect to input values cannot be determined when the software is designed (a typical example thereof is as software using an evaluation algorithm generated through a machine learning), it is necessary to perform a test based on a huge amount of test data including input values with unpredictable output values.

SUMMARY OF THE INVENTION

The present invention provides software test equipment and a software testing method for evaluating whether software with unpredictability behaves as expected.

According to an exemplary embodiment of the present invention, there is provided software test equipment, which, by a computer, receives test input data to test target software and evaluates a behavior of the software based on output data from the software, the software test equipment including: a data conversion unit configured to receive test input data to convert it into software input data to be provided to the software and model input data to be provided to a reference model; a software execution unit configured to receive the software input data, execute the test target software based on the software input data, and output an execution result; a model execution unit configured to receive a reference model for the software to generate a model allowable output value range representing an allowable output value range of the execution result obtained by executing the software, based on the model input data and the reference model; a difference analysis unit configured to generate difference information based on the execution result output by the software execution unit and the model allowable output value range generated by the model execution unit; and an evaluation unit configured to receive evaluation criteria and evaluate the behavior of the software based on the difference information and the evaluation criteria.

According to the present invention, software test equipment and a software testing method capable of evaluating whether software having unpredictability behaves as expected can be obtained.

BRIEF DESCRIPTION OF THE DRAWINGS

FIG. 3 is a diagram showing an example of a notation of a reference model;

FIG. 4 is a diagram showing an example of a notation of evaluation criteria;

FIG. 5 is a diagram showing an example of a structure of a model allowable output value range;

FIG. 6 is a diagram showing an example of the structure of difference information;

FIG. 7 is a flowchart showing the procedure of Procedure 1 performed by a data conversion unit;

FIG. 8 is a flowchart showing the procedure of Procedure 2 performed by a software execution unit;

FIG. 16 is a diagram showing an example of input/output data according to a first embodiment;

FIG. 17 is a diagram showing a description example of a first reference model and first evaluation criteria according to the first embodiment;

FIG. 18 is a diagram showing a description example of a reference model according to a second embodiment;

FIG. 19 is a diagram showing a description example of evaluation criteria according to the second embodiment;

FIG. 20 is a diagram showing an example of input/output data according to a third embodiment;

FIG. 21 is a diagram showing an example of a second reference model and second evaluation criteria according to the third embodiment;

FIG. 22 is a diagram showing an example of input/output data according to a fifth embodiment;

FIG. 23 is a diagram showing an example of a third reference model and third evaluation criteria according to the fifth embodiment; and FIG. 24 is a diagram showing an example of input/output data according to a sixth embodiment.

DESCRIPTION OF EMBODIMENTS

Embodiments of the present invention will be described in detail below with reference to the drawings.

First Embodiment

Figure 1:
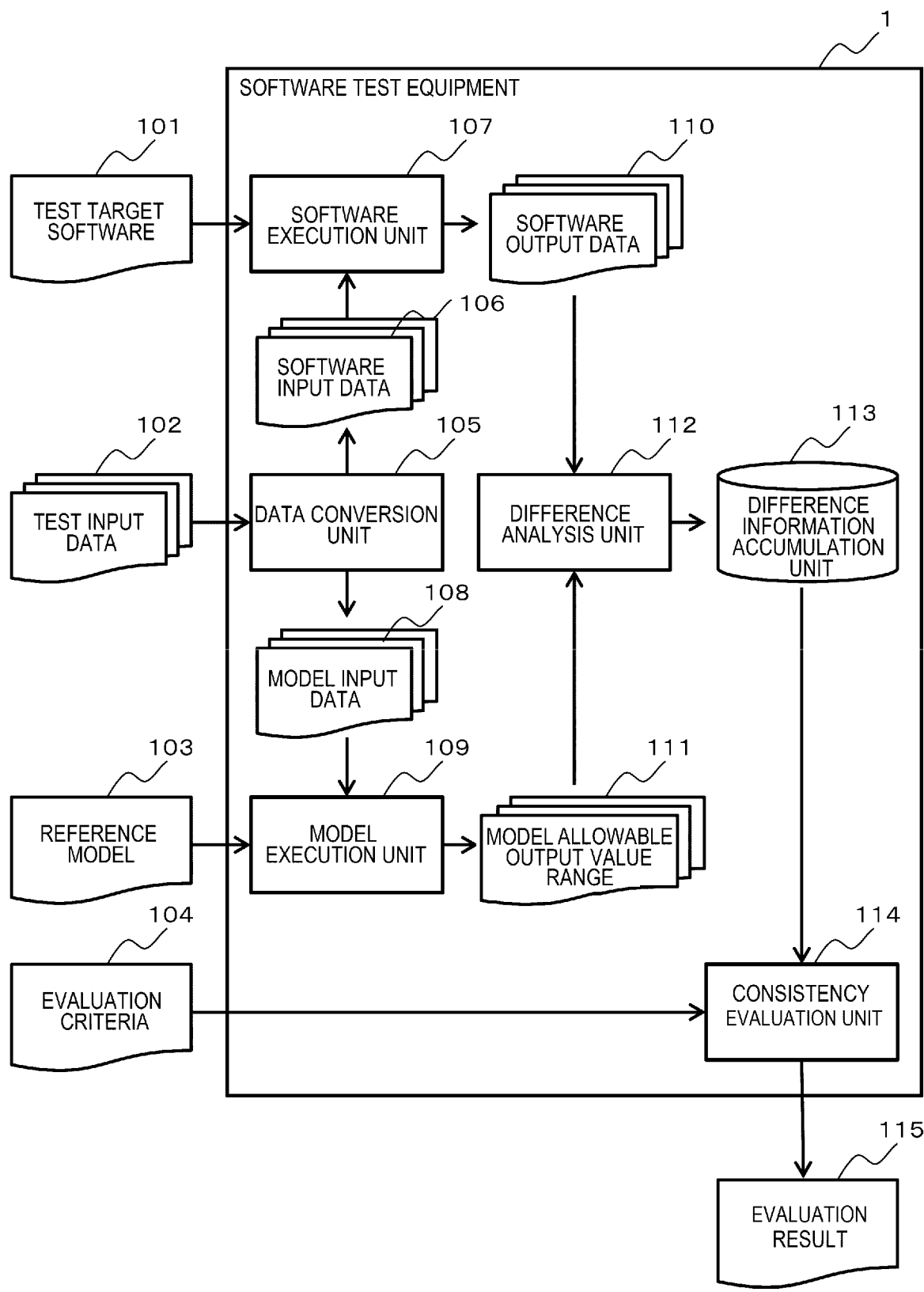
FIG. 1 is a diagram showing a configuration of software test equipment according to an embodiment.

FIG. 1 is a diagram showing the structure of software test equipment 1, where test target software 101, a reference model 103, and evaluation criteria 104 are input, a test is performed on test input data 102, and an evaluation result 115 is output. Generally, a plurality of pieces of test input data 102 are provided for one test target software 101, and results obtained by performing a test with the test input data 102 are evaluated based on the evaluation criteria 104, and thus the evaluation result 115 is generated. From the test input data 102, a data conversion unit 105 extracts software input data 106, which is input data of the test target software 101, and model input data 108, which is input data of the reference model.

The software execution unit 107 executes the test target software 101 with the software input data 106, thereby generating software output data 110. The model execution unit 109 also calculates a range of expected software output data from the model input data 108 and generates a model allowable output value range 111. A difference analysis unit 112 analyzes whether the software output data 110 satisfies or deviates from the model allowable output value range 111 and stores results of the analysis in a difference information accumulation unit 113. A consistency evaluation unit 114 evaluates difference information of the difference information accumulation unit 113 according to the input evaluation criteria 104 and outputs the evaluation result 115. Each functional unit of the software test equipment 1 is implemented as a CPU (processor) of a computer, which is a hardware resource, executes software.

In this embodiment, a user prepares the reference model 103 and the evaluation criteria 104 in addition to the test target software 101 and the test input data 102 and verifies that output values of the test target software 101 are within allowable ranges of the reference model under the evaluation criteria 104 by using software test equipment.

In FIG. 1, in case of performing tests in a plurality of viewpoints on the same test target software 101 and test input data 102, a plurality of model execution units 109, a plurality of difference analysis units 112, and a plurality of consistency evaluation units 114 may be prepared, and tests using a plurality of reference models 103 and the evaluation criteria 104 may be performed on the same software output data 110 at the same time. Also, when the model allowable output value range 111 depends on the history of software outputs, the software output data 110 may be returned to the data conversion unit 105 and used as the model input data 108.

Figure 2:
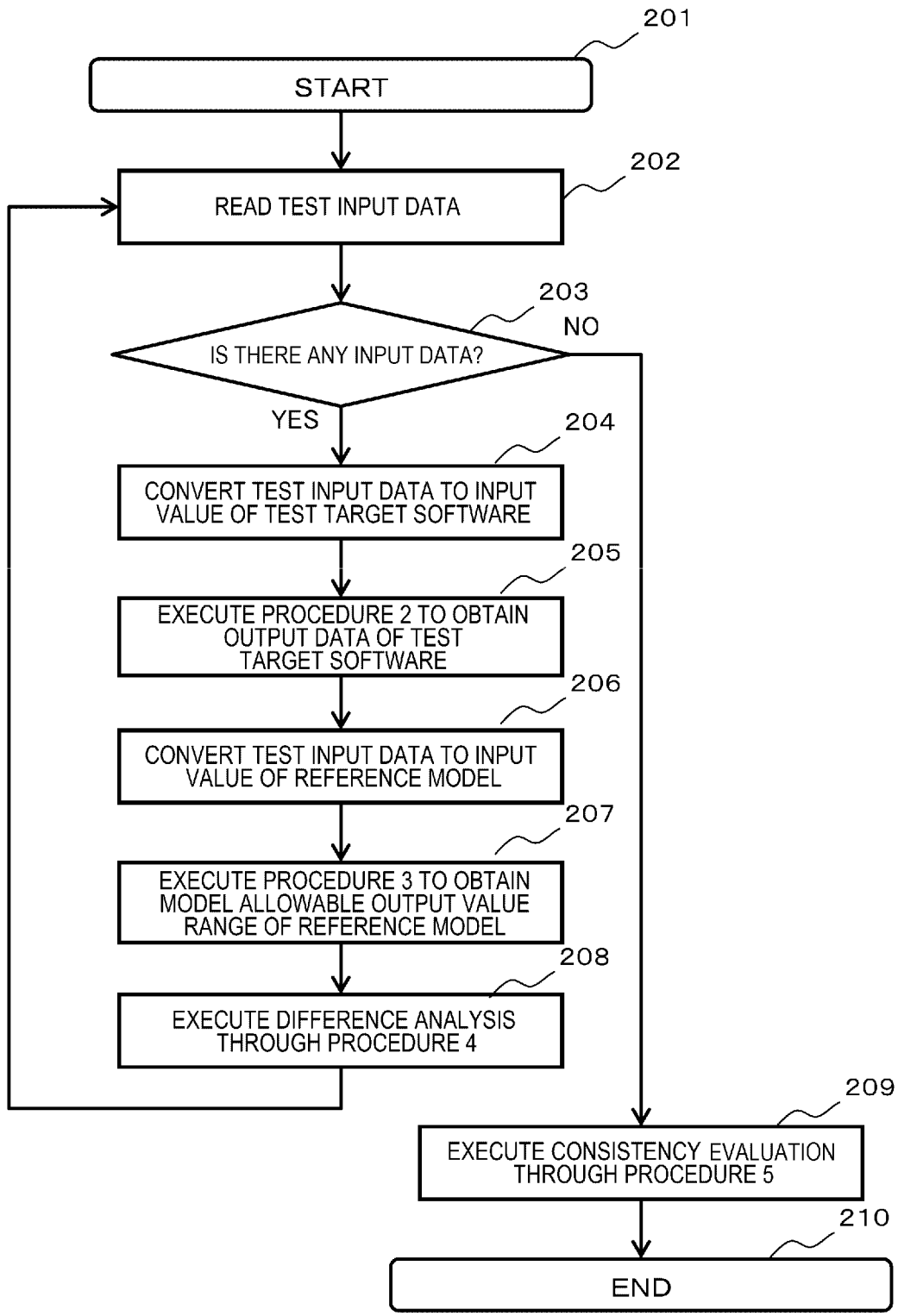
FIG. 2 is a flowchart of a software testing method in the software test equipment.

FIG. 2 is a flowchart of a software testing method in the software test equipment 1. The software test equipment 1 reads the test input data 102 (202), if there is no input data (203), evaluates consistency according to the procedure shown in Procedure 5 (209), and terminates the method (210).

If there is test input data, the software test equipment 1 converts the test input data 102 into input values of the test target software 101 (204) and obtain output data of the test target software 101 (205) according to the procedure shown in Procedure 2. Likewise, the software test equipment 1 converts the test input data 102 into input values of the reference model 103 (206) and obtains the model allowable output value range 111 of the reference model 103 according to the procedure shown in Procedure 3 (207).

Next, a difference analysis between the software output data 110 and the model allowable output value range 111 is performed according to the procedure shown in Procedure 4 (208), and the method returns to the step 202 and next test input data 102 is read.

FIG. 3 shows an example of a notation of the reference model 103, and a user inputs the reference model 103 written according to the notation. An example of the reference model 103 is shown in FIG. 17. In the embodiment, the reference model 103 is expressed as an abstract machine, which is a formal model abstracting operations of a computer. In the present embodiment, a finite state machine, which is a type of abstract machines, is used. The finite state machine consists of states of an abstracted computer, input to the computer, conditions for transition of the states, and outputs from the computer. The notation shown in FIG. 3 is used to specifically describe an embodiment, and notations of abstract machines used in the present embodiment are not limited thereto. In FIG. 3, the notation is represented by extended Backus-Naur Form. Here, '{ }' represents zero or more repetitions of elements in { }, '[ ]' indicates that element in [ ] is optional, '|' indicates 'or', and '" "' indicates a keyword.

The reference model 103 is a sequence of one or more transitions (301), and a transition is an equation having a state name before the transition on the left side and one or more transition destinations on the right side (302). Here, a transition destination is either a conditional transition destination or an unconditional transition destination (303). The conditional transition destination is composed of an input, a transition condition, an allowable output value range, and a state name (304). A conditional transition destination shows that when the input satisfies the transition condition, the allowable output value range is output and a transition to state of the state name is made. Here, the transition condition and the allowable output value range may be omitted. The unconditional transition consists of only the state name (305), unconditionally make transition to the state of the state name. The input is a sequence of one or more input variables (306), and the input variables are referred to as a transition condition. The allowable output value range is a sequence of one or more output values (307), and the state name is an arbitrary identifier or a start state (308). Here, the start state is a special identifier indicating the starting point of state transitions of a model and is denoted by "S0" in the present embodiment. In the reference model 103, a forbidden output value range may be described instead of the allowable output value range.

FIG. 4 shows an example of a notation of the evaluation criteria 104. A user inputs the evaluation criteria 104 written according to the notation. An example of the evaluation criteria 104 is shown in FIG. 17. The notation of FIG. 4 is used to specifically describe the present embodiment, and notations of the evaluation criteria 104 used in the present embodiment are not limited thereto. As in FIG. 3, the notation is represented by extended Backus-Naur Form in FIG. 4.

The evaluation criteria 104 is a list of one or more weight designations (401). The weight designation is composed of a transition origin state name, a transition destination state name, and an error weight (402). When a transition occurs from the state of the transition origin state name to the state of the transition destination state name on the reference model 103, an error weight to be applied to difference information 113 with an output of the test target software 101 according to the transition designated.

FIG. 5 shows an example of a structure of the model allowable output value range 111. This information is generated by the model execution unit 109 and is used by the difference analysis unit 112. The model allowable output value range 111 is a sequence of a pair of an input number for identifying input data in the test input data 102 and a tuple of a transition origin state name, a transition destination state name, an allowable output value range, and a next state name (501). When there is a conditional transition whose input data of an input number satisfies the transition condition for the state of the transition origin state name of the reference model 103, the transition destination state name and the allowable output value range to be output are grouped. The next state name is the state name in which state next input data is being waited for after the transition, and, when there is no unconditional transition following the transition destination state, the next state name coincides with the transition destination state name. If there are unconditional transitions following the transition destination state, unconditional transitions are repeated until conditional transition is achieved and the next state name is replaced with the before state name of the achieved conditional transition. The structure of FIG. 5 is used in association with the reference model 103 in order to specifically describe a processing procedure in the present embodiment, and the structure of the model allowable output value range 111 according to the present embodiment is not limited thereto.

FIG. 6 shows an example of the structure of difference information stored in the difference information accumulation unit 113. The difference information is generated by the difference analysis unit 112, and the consistency evaluation unit 114 refers to the difference information. Like the model allowable output value range 111, the difference information is a sequence of a pair of an input number and a tuple of a transition origin state name, a transition destination state name, a next state name, a difference evaluation value, and software output data 110 (601). The difference between the model allowable output value range 111 and output value of the test target software 101 is evaluated by the difference information analysis unit and difference information is generated. The transition origin state name, the transition destination state name, and the next state name are identical to that of the corresponding model allowable output value range. As in FIG. 5, the structure of FIG. 6 is used in association with the structure of the model allowable output value range 111 and the evaluation criteria 104 to specifically describe the processing procedure according to the present embodiment, and the structure of difference information according to the present embodiment is not limited thereto.

FIG. 7 shows a flow of processing performed by the data conversion unit 105. The data conversion unit 105 reads the test input data 102 given by a user (702) and, if there is no test input data 102 to be processed (703), terminates the process (708). If the test input data 102 to be processed exists, the data conversion unit 105 converts the test input data 102 into input values that can be processed by the test target software 101 (704) and sends the converted input values to the software execution unit 107 as software input data 106 (705). Next, the data conversion unit 105 converts the same test input data 102 into input values that can be processed by the reference model 103 (706) and sends the converted input values to the model execution unit 109 as the model input data 108 (707). Thereafter, the data conversion unit 105 returns to the step 702 and reads next test input data 102.

FIG. 8 shows a process flow of Procedure 2, in which an input value is given to the test target software 101 and an output value is calculated. This processing is performed by the software execution unit 107. The software execution unit 107 reads the test target software 101 given by a user (802). Next, the software execution unit 107 receives the software input data 106 from the data conversion unit 105 (803). If there is no input value (804), the process is terminated (807). If there is an input value, the software execution unit 107 executes test target software 101 with the input value and obtains an output value (805). The obtained output value is sent as the software output data 110 to the difference analysis unit 112 (806), and the software execution unit 107 returns to the step 803 and receives next software input data 106.

Figure 9:
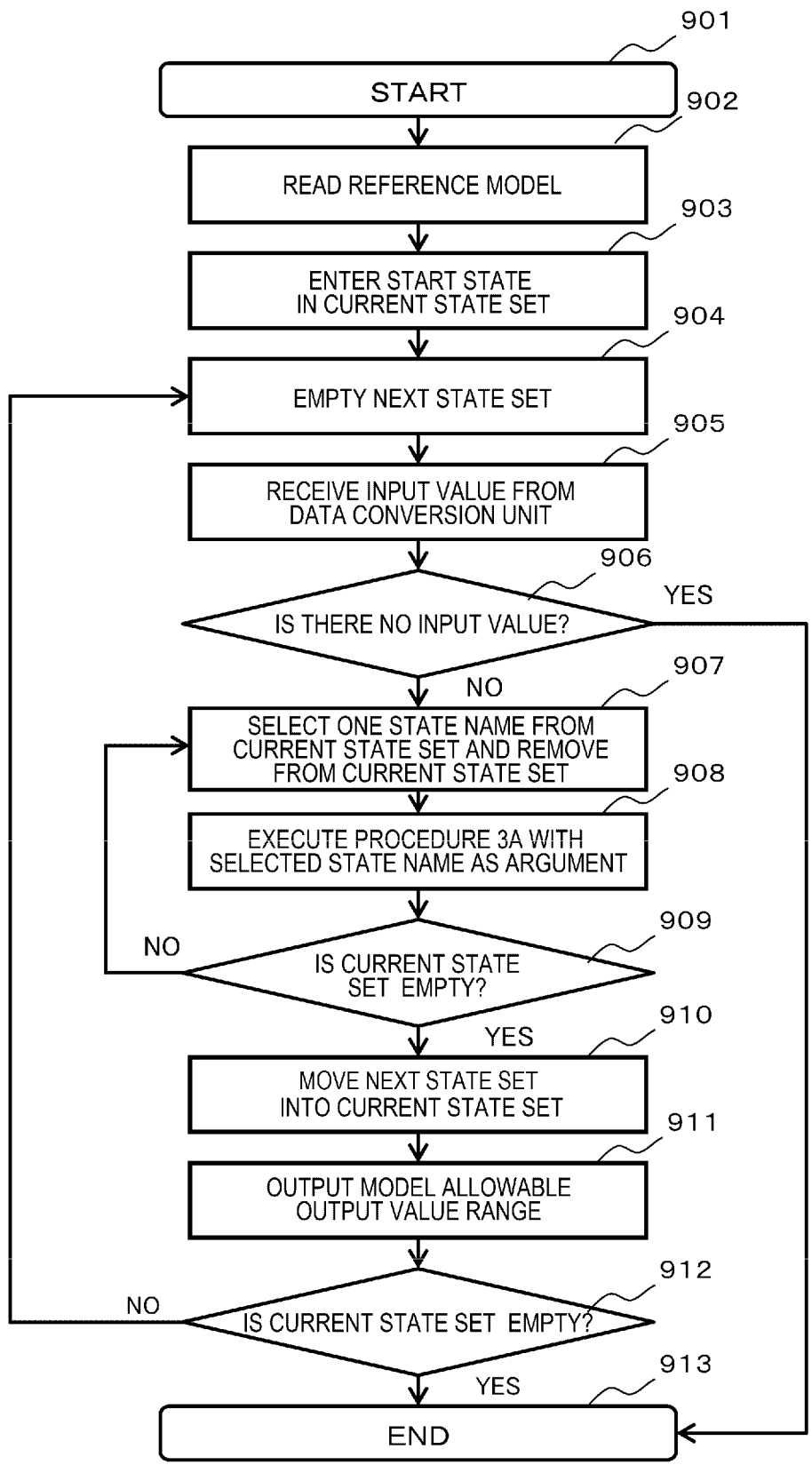
FIG. 9 is a flowchart showing the procedure of Procedure 3 performed by a model execution unit.

FIG. 9 shows a processing flow of Procedure 3, in which the state of the reference model 103 is transited with respect to a given input value and the model allowable output value range 111 is calculated. This process is performed by the model execution unit 109. In this processing flow, temporary variables "current state set" and "next state set" are used to store information needed for processing. The model execution unit 109 reads the reference model 103 given by a user (902), adds the start state to the current state set as an initial state (903), and empties the next state set (904). The model execution unit 109 receives the model input data 108 from the data conversion unit 105 (905). If there is no input value (906), the process is terminated (913). If there is an input value, the model execution unit 109 selects one state name in the current state set and remove it from the current state set (907), and Procedure 3A is performed with the selected state name as an argument (908). If the current state set is not empty (909), the model execution unit 109 returns to the step 907 and repeats processing for the remaining state names. If the current state set is empty, all of the state names stored in the next state set are moved to the current state set (910), and the model allowable output value ranges 111 generated in Procedure 3A are output (911). If the current state set is not empty (912), the process returns to the step 904 and processing continues. If the current state set is empty, the processing is terminated (913).

Figure 10:
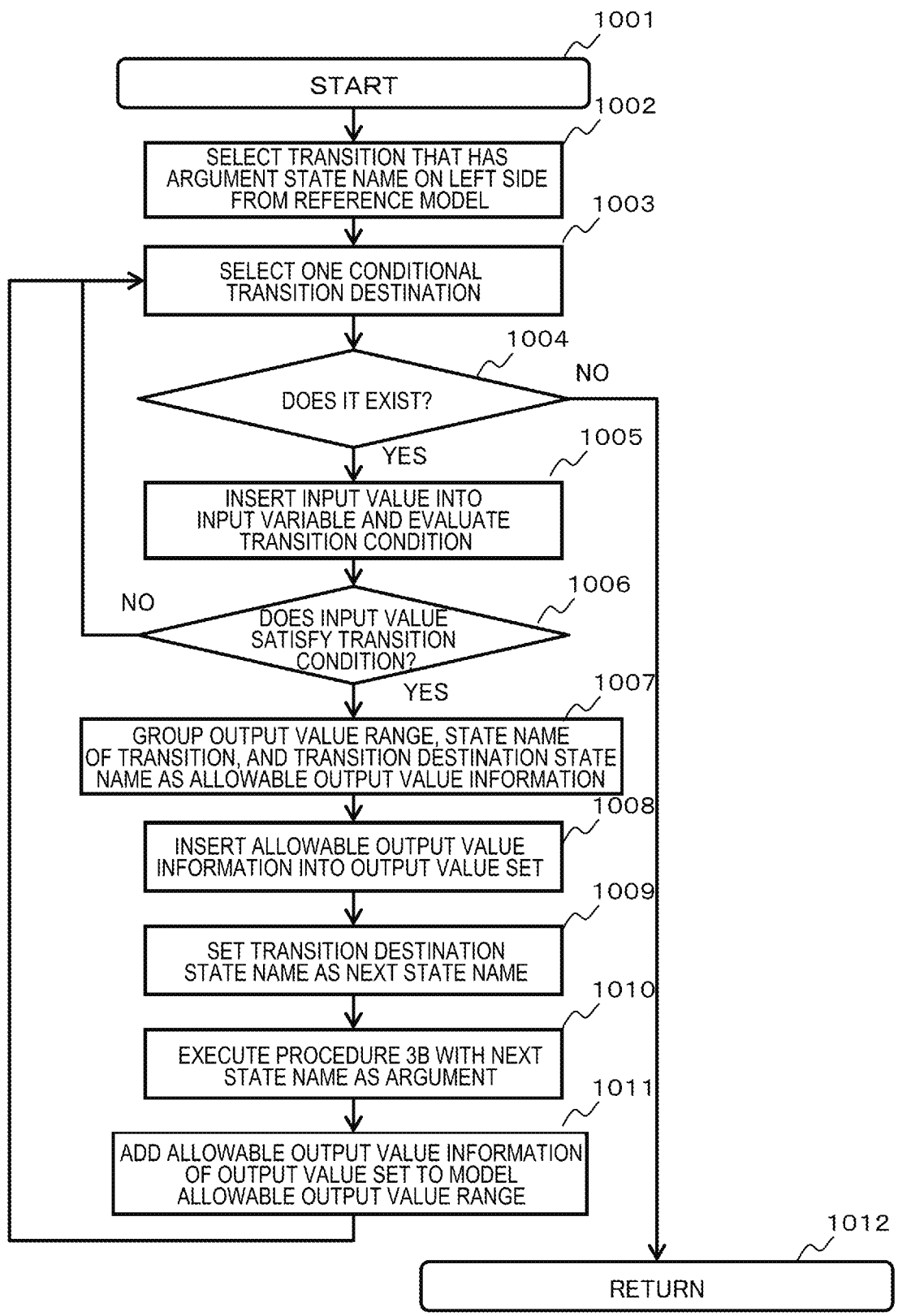
FIG. 10 is a flowchart showing the procedure of Procedure 3A invoked from Procedure 3.

FIG. 10 is a flowchart showing the procedure of Procedure 3A invoked from Procedure 3 of FIG. 9. In Procedure 3A, the state name of transition origin is received from the Procedure 3 as an argument and the model allowable output value range 111 is generated. Procedure 3A uses a temporary variable "output value set" during the process. First, a transition having the state name, which is given as argument, on the left side is selected from the reference model 103 (1002), and one conditional transition destination on the right side is obtained (1003). If there is no conditional transition destination in the reference model 103 (1004), the process returns to Procedure 3. Otherwise, the input value received in Procedure 3 is given to the input described in the conditional transition destination and the transition condition is evaluated (1005). When the transition condition is not satisfied (1006), the process returns to the step 1003 and another next conditional transition destination is selected. When the transition condition is satisfied, allowable output value information is generated by grouping the allowable output value range described in the conditional transition destination, the state name of the transition, and the transition destination state name (1007). Here, when a forbidden output value range is described in the reference model 103, a mark indicating that the output value range is forbidden is attached. The allowable output value information is stored in an output value set (1008), the transition destination state name is set as a next state name (1009), and Procedure 3B is executed with the next state name as an argument (1010). After returning from Procedure 3B, the allowable output value information of the output value set is added to the model allowable output value range 111 (1011), and the process returns to the step 1003 to process the remaining conditional transition destinations (1003).

Figure 11:
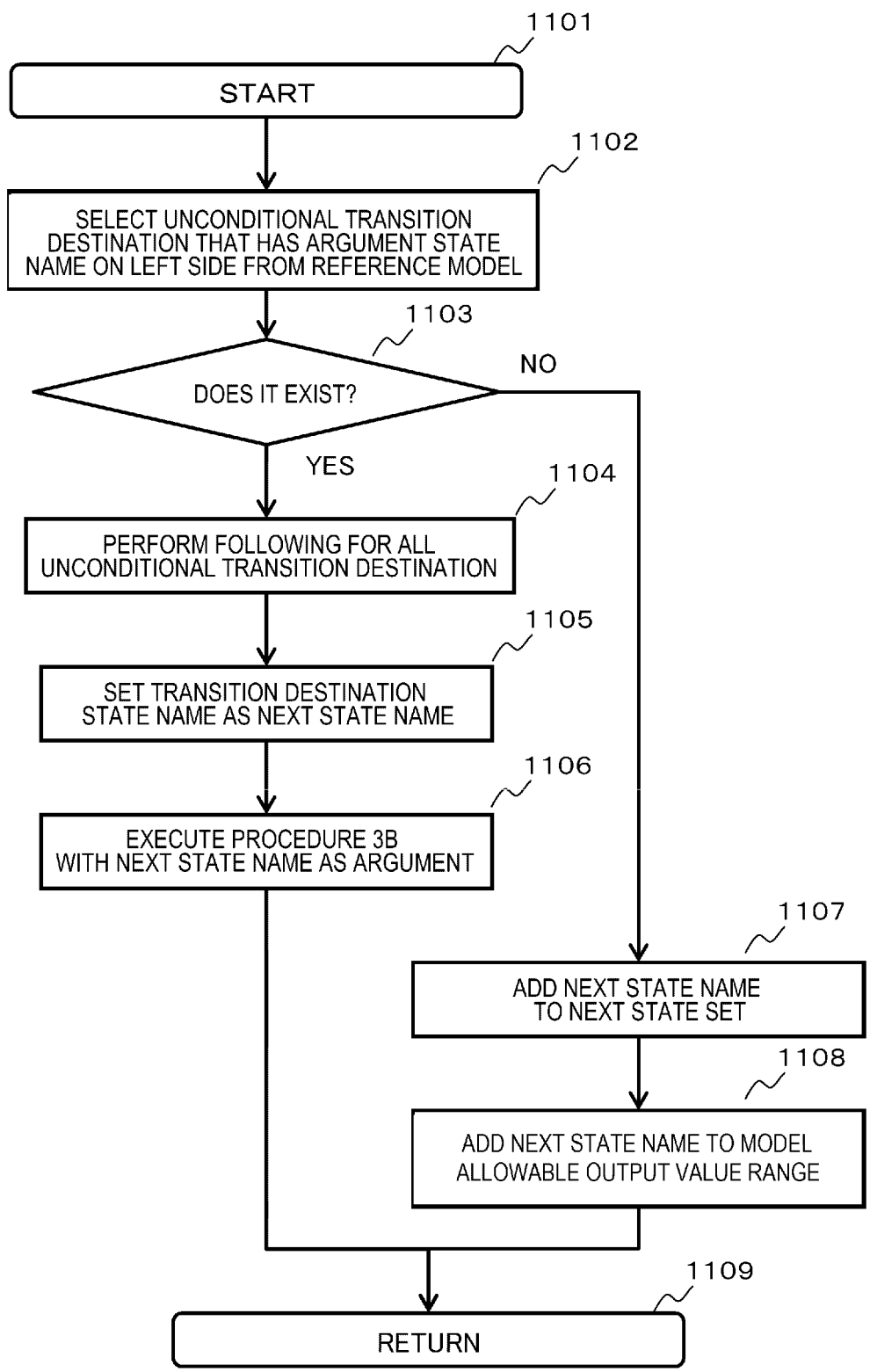
FIG. 11 is a flowchart showing the procedure of Procedure 3B invoked from Procedure 3A.

FIG. 11 is a flowchart showing the procedure of Procedure 3B invoked from Procedure 3A of FIG. 10. In Procedure 3B, a next state name is received as an argument, unconditional transition destinations are traced, and the next state name is replaced with the name of a state in which next input data is waited for. First, a transition having the next state name, which is given as an argument, on the left side is selected from the reference model 103, and an unconditional transfer destination is obtained (1102). If there is no unconditional transition destination (1103), the next state name is added to both the next state set (1107) and the next state name of the model allowable output value range 111 (1108) to complete the tuple. Next, the process returns to the caller process. If an unconditional transition destination exists in the selected transition, the steps 1105 to 1106 are performed for all unconditional destinations of the transition (1104). The next state name is replaced with the transition destination state name of the unconditional transfer destination (1105), and the processing of Procedure 3B is recursively performed with the replaced next state name as an argument (1106). Upon completion of the processing, the process returns to the caller process (1109).

Figure 12:
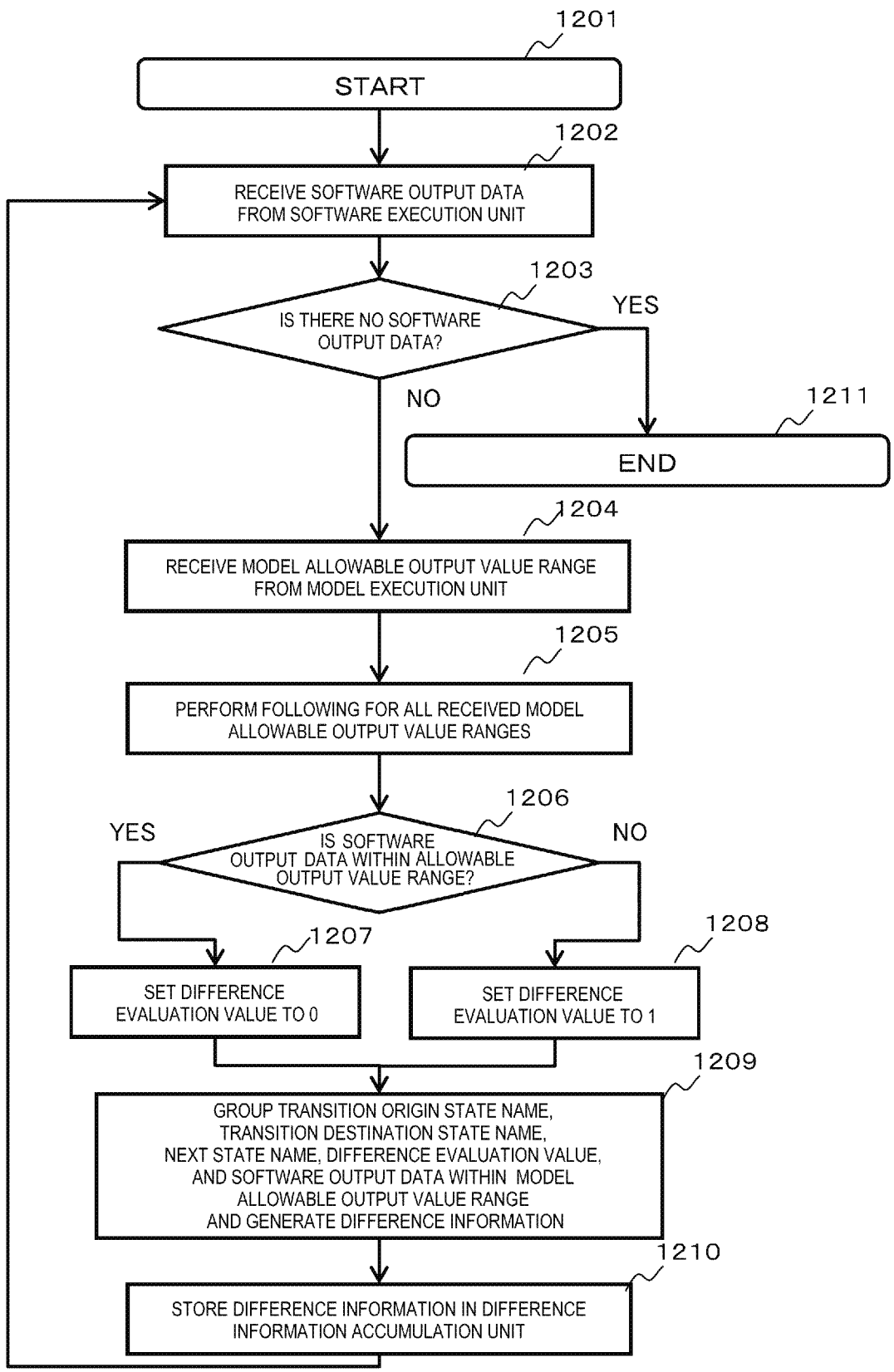
FIG. 12 is a flowchart showing the procedure of Procedure 4 performed by a difference analysis unit.

FIG. 12 shows a processing flow of Procedure 4, in which the software output data 110 received from the software execution unit 107 is checked against the model allowable output value range 111 received from the model execution unit 109 and difference information is generated and stored in the difference information accumulation unit 113. This process is performed by the difference analysis unit 112. First, the software output data 110 is received from the software execution unit 107 (1202). If the software output data 110 does not exist (1203), the process is terminated (1211). If there is the software output data 110, the model allowable output value range 111 is received from model execution unit 109 (1204), and steps from the step 1206 are performed for all received model allowable output value ranges 111 (1205). If the software output data 110 is within the allowable output value range of the model allowable output value range 111 (1206), a difference evaluation value is set to 0 (1207). If the software output data 110 is outside the model allowable output value range 111, the difference evaluation value is set to 1 (1208). However, when a mark indicating that a corresponding output value range is forbidden is attached to the allowable output value range, the difference evaluation value is set to 1 if the software output data 110 within the range, and set to 0 if the software output data 110 is outside the range. Difference information is generated by grouping the transition origin state name, the transition destination state name, the next state name of the model allowable output value range 111, the difference evaluation value, and the software output data 110 (1209), and is stored in the difference information accumulation unit 113 (1210). Thereafter, the process returns to the step 1202, and next software output data 110 is received. In the present embodiment, the difference evaluation value is set to 0 if the software output data 110 is within the model allowable output value range 111 and is set to 1 if the software output data 110 is not within the model allowable output value range 111. Alternatively, a difference evaluation value based on a metric with the model allowable output value range 111 may be used.

Figure 13:
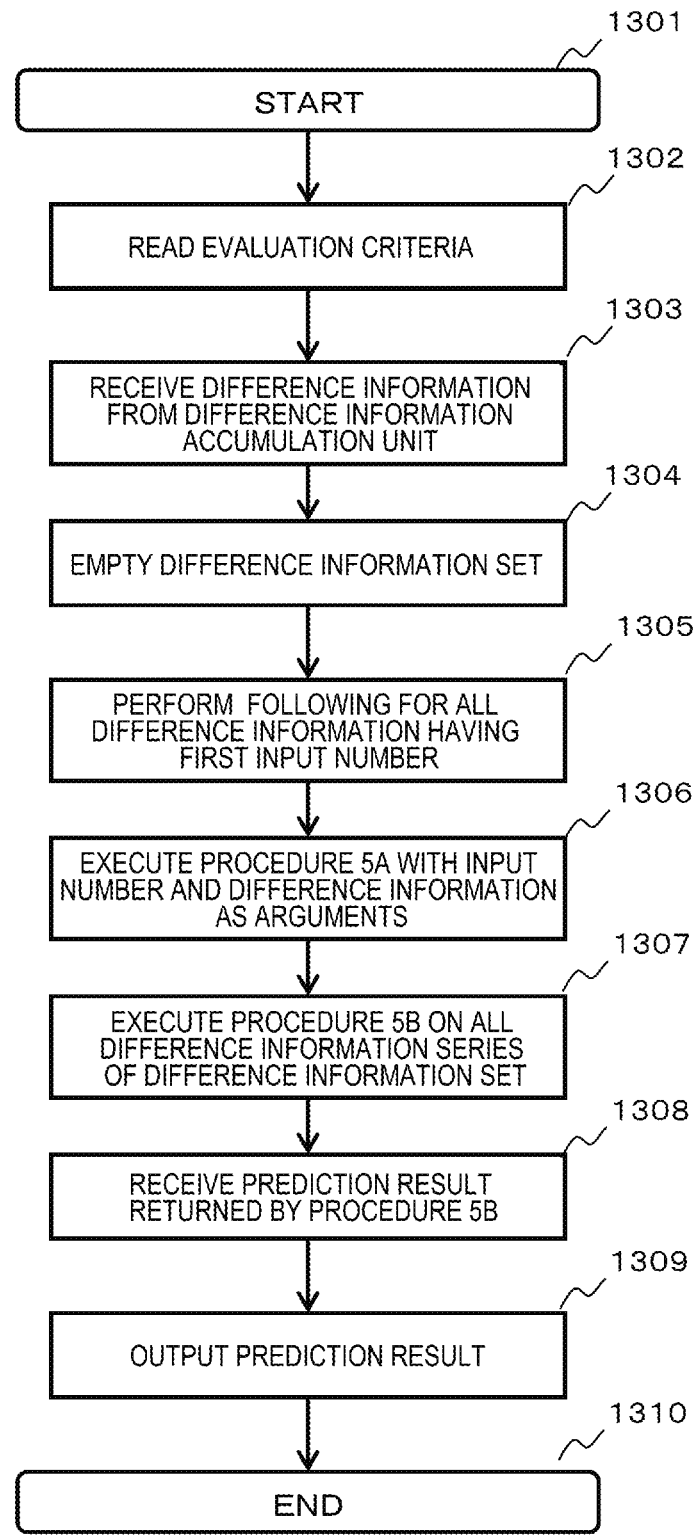
FIG. 13 is a flowchart showing the procedure of Procedure 5 performed by a consistency evaluation unit.

FIG. 13 shows a processing flow of Procedure 5, in which a series of difference information that covers all the test input data 102 is searched for in the difference information stored in the difference information accumulation unit 113, the difference information series is evaluated under the evaluation criteria 104, and the evaluation result 115 is output. This process is performed by the consistency evaluation unit 114. Procedures 5 and 5A use a temporally variable "difference information set" during the process. The consistency evaluation unit 114 reads the evaluation criteria 104 given by a user (1302) and then receives difference information from the difference information accumulation unit 113 (1303). The difference information set is emptied (1304), and steps from step 1306 are performed for all difference information having a first input number (1305). First, Procedure 5A is performed with the input number and the difference information as arguments (1306), and Procedure 5B is performed for all difference information series of the difference information set (1307). Here, if there is no difference information series in the difference information set, Procedure 5B and procedures thereafter are not performed, and the process proceeds to the processing of next difference information in the step 1305. An evaluation result 115 returned by the Procedure 5B is received (1308) and output (1309). If difference information having the first input number does not exist in the step 1305 or the processing of all the difference information is completed, the process is terminated (1310).

Figure 14:
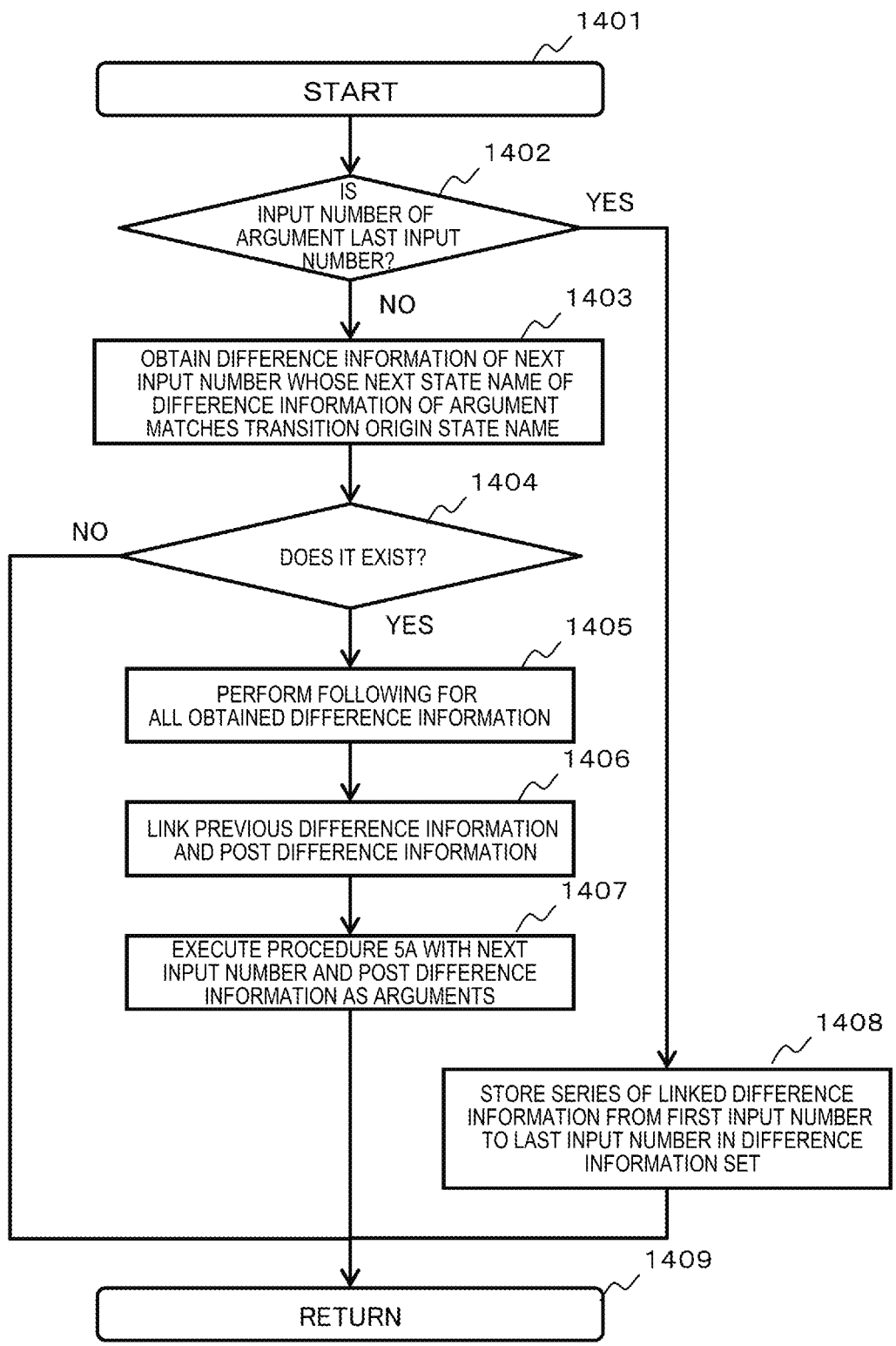
FIG. 14 is a flowchart showing the procedure of Procedure 5A invoked from Procedure 5.

FIG. 14 is a flowchart showing the procedure of Procedure 5A invoked from Procedure 5 of FIG. 13. In Procedure 5A, a difference information series that covers all the test input data 102 is searched for and stored in the temporary variable difference information set. In Procedure 5A, by using an input number and difference information as arguments, if the input number is equal to the input number of the last test input data 102 (1402), a sequence of difference information linked from the first input number to the last input number is constructed and stored in the difference information set (1408), and the process returns to the caller process (1409). If the input number, which is given by the argument, is not the last input number, difference information with the next input number whose transition origin state name matches next state name of difference information (given as an argument), is obtained (1403). When such difference information does not exist (1404), the process returns to the caller process with no further action (1409).

If difference information exists, the steps from the step 1406 are performed for all such difference information (1405). The difference information given as an argument is linked as previous difference information to the difference information obtained in the step 1403 as post difference information (1406), and the Procedure 5A is recursively performed with the next input number and the post difference information as arguments (1407). Thereafter, the process returns to the caller process (1409).

Figure 15:
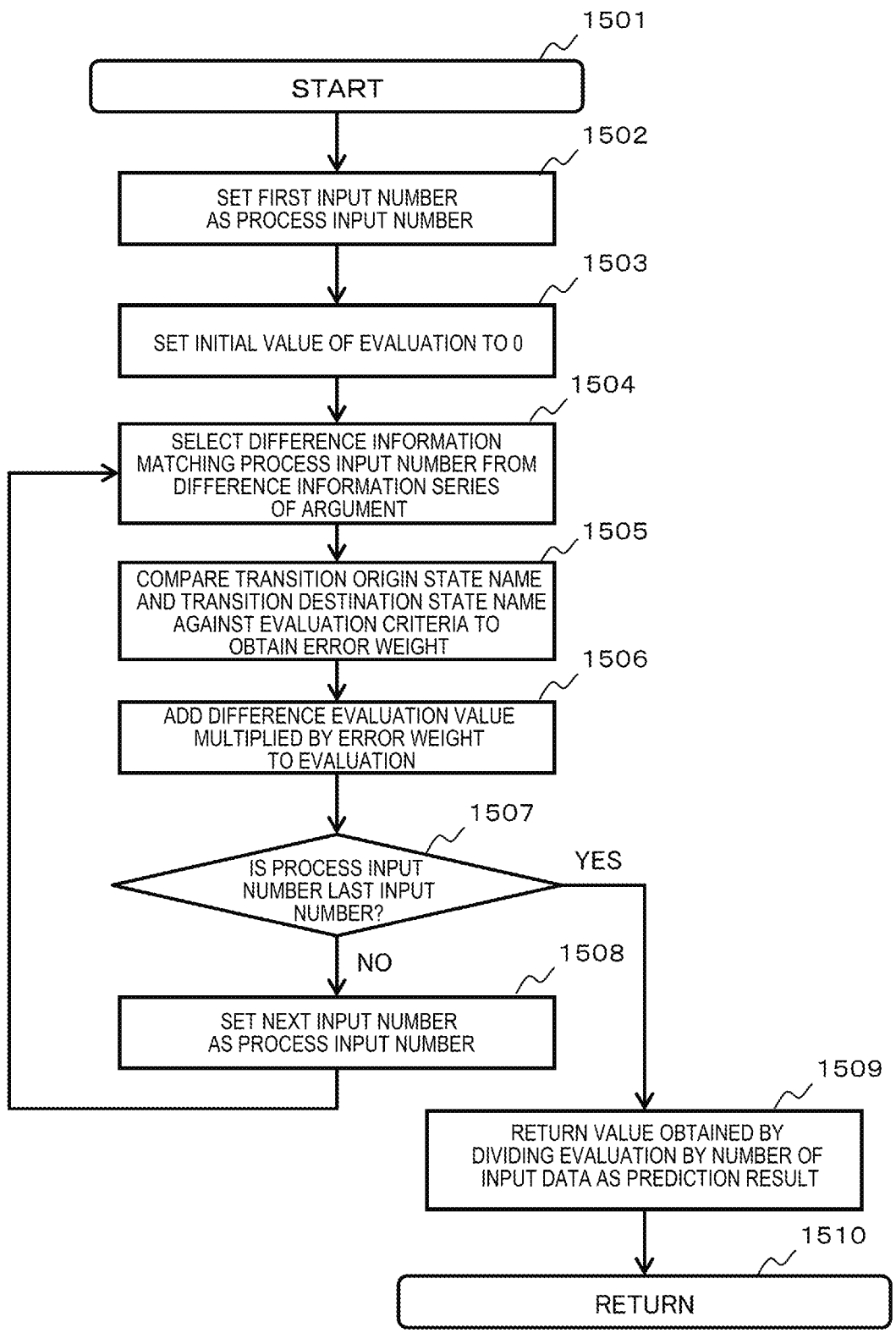
FIG. 15 is a flowchart showing the procedure of Procedure 5B invoked from Procedure 5.

FIG. 15 is a flowchart showing the procedure of Procedure 5B invoked from Procedure 5 of FIG. 13. In Procedure 5B, the evaluation criteria 104 is applied to the difference information series generated in Procedure 5A, thereby generating an evaluation value. In Procedure 5B, a temporary variable "process input number" is used to manage input numbers being processed. First, the initial value of the process input number is set as the first input number (1502), and set initial value of evaluation to 0 (1503). From the difference information series given as an argument, difference information that matches the process input number is selected (1504). The transition origin state name and the transition destination state name of the selected difference information are checked against the evaluation criteria 104 to obtain an error weight (1505), and the error weight is applied to a difference evaluation value of the difference information and the difference evaluation value is added to the evaluation (1506). If the process input number is equal to the last input number (1507), the value obtained by dividing the evaluation by the number of input data is output (1509) and the process returns to the caller process (1510). If the process input number is not equal to the last input number, the next input number is processed as process input number (1508) and the process returns to step 1504 to continue the process.

An embodiment in which software for recognizing an input image is set as the test target software 101 is shown, and the outline of the present embodiment will be described. The purpose of the present embodiment is to evaluate that output data of the test target software 101 regarding the test input data 102 arbitrarily given satisfies requirements under the evaluation criteria 104. Since a test of the present embodiment is a test to verify that the test target software 101 satisfies the reference model 103, the reference model 103 provides the basis of the reliability of the test target software 101.

A procedure for achieving the purpose of the first embodiment will be described below. It is assumed that the test target software 101 evaluates the state of an object as one of the following five states from an input image of the object. L1: possibly colliding, L2: possibly not colliding, L3: possibly approaching, L4: possibly not approaching, L5: unknown The test target software 101 has an evaluation algorithm generated through a machine learning, for example, and it is assumed that the test target software 101 is unable to be logically analyzed how it evaluates features of an object and which of the features of the object is/are dominant for evaluation. In other words, it is premised that the test target software is software with unpredictability that outputs an evaluation result that is unpredictable from an input, that is, an image of an object.

Requirements for the test target software 101 include that a possibility of collision risk is evaluated when an object in an image is large, any evaluation including 'unknown' may be made when the object in the image is small, and an evaluation other than "unknown" shall be made when the size of the object in the image is therebetween. When the test target software 101 has statistical uncertainty, it is not reasonable to judge to reject the test target software 101 even if an output value thereof fails to satisfy the requirements. For example, in the field of image recognition, it is difficult to completely eliminate an erroneous evaluation influenced by inappropriate features. On the other hand, if the impact of an erroneous evaluation is serious for the requirements, it is reasonable to reject the test target software 101. Here, it is assumed that an erroneous evaluation is evaluated severely when an object in an image is large and is evaluated loosely when the object is small.

The software test equipment of the present embodiment receives inputs of the test target software 101, the reference model 103, the evaluation criteria 104, and the test input data 102 and outputs the evaluation result 115. More specifically, the requirement therefor is that, with respect to the vertical length h of the image, when the vertical length o of the object in the image
- is smaller than h/5, an evaluation value may be any one of L1, L2, L3, L4, and L5,
- is equal to or greater than h/5 and smaller than h/2, an evaluation value is one of L1, L2, L3, and L4, and
- is equal to or greater than h/2, evaluation values are L1 and L2. The reference numeral 1701 of FIG. 17 denotes an example of a first reference model in which the above requirements are described by using the notation shown in FIG. 3. For example, a current state name of the first row of the first reference model 1701 is S0. Model input data 1605 includes a vertical length o of an object and a vertical length h of the image. The transition condition is that o is smaller than h/5. When the model input data 1605 satisfies the transition condition, an allowable output value range 1606, which is the output range expected for software output data 1604, include L1, L2, L3, L4, and L5. Furthermore, it is indicated that, when the model input data 1605 satisfies the transition condition, the state is transited to the state of a next state name S1.

For the evaluation criteria 104, a heavy error weight is applied when an object image is large and an evaluation value does not satisfy the requirements and a light error weight is applied when the object is small and the evaluation value does not satisfy the requirements, thereby comprehensively judging pass/fail of a test. Such weight application for pass/fail evaluation will be expressed using the notation shown in FIG. 4. The reference numeral 1702 of FIG. 17 denotes an example of first evaluation criteria. An example of the test input data 102 is shown in FIG. 16. In this example, it is assumed that five images 1 to 5 for input numbers 1601 are input as the test input data 1602.

The data conversion unit 105 converts the test input data 102 into input values of the test target software 101 and input values of the reference model 103 according to the sequence of Procedure 1 described in FIG. 7. It is assumed that the test target software 101 of the present embodiment receives an image of an object cut out from the test input data 102 as an input value. On the other hand, as described above, the reference model 103 receives a height h of the image of the test input data 102 and a height o of the object as input values. The software input data 106 output by the data conversion unit 105 is shown in 1603, and the model input data 108 is shown in 1605.

The software execution unit 107 executes the test target software 101 on the software input data 106 received from the data conversion unit 105 according to the sequence of Procedure 2 shown in FIG. 8 and sends output values to the difference analysis unit 112 as the software output data 110. In the present embodiment, we assume that the test target software 101 outputs the software output data 1604 when the software input data 1603 is input. In this case, the software output data 1604 output by the software execution unit 107 are as follows.

L5 for input values of an input number 1,
L1 for input values of an input number 2,
L5 for input values of an input number 3,
L3 for input values of an input number 4, and
L2 for input values of an input number 5.

According to the sequence of Procedure 3 shown in FIG. 9, the model execution unit 109 generates the model allowable output value range 111 for the model input data 108 received from the data conversion unit 105 and send them to the difference analysis unit 112. Input values received by the model execution unit 109 are shown in 1605, and an allowable output value range calculated under the reference model 103 shown in FIG. 17 is shown in 1606. The model allowable output value range 111 output by the model execution unit 109 are as follows.

Input number 1 (S0, S1, {L1, L2, L3, L4, L5}, S0)
Input number 2 (S0, S3, {L1, L2}, S0)
Input number 3 (S0, S2, {L1, L2, L3, L4}, S0)
Input number 4 (S0, S2, {L1, L2, L3, L4}, S0)
Input number 5 (S0, S3, {L1, L2}, S0)

The difference analysis unit 112 correlates the software output data 110 output by the software execution unit 107 with the model allowable output value range 111 output by the model execution unit 109 according to the sequence of Procedure 4 shown in FIG. 12 and generates difference information. The difference information stored in the difference information accumulation unit 113 is as follows.

Input number 1 (S0, S1, S0, 0, L5)
Input number 2 (S0, S3, S0, 0, L1)
Input number 3 (S0, S2, S0, 1, L5)
Input number 4 (S0, S2, S0, 0, L3)
Input number 5 (S0, S3, S0, 0, L2)

In this example, for the input values of the input number 3, output values of the test target software 101 do not in the allowable output value range of the reference model 103.

According to the sequence of Procedure 5 in FIG. 13, the consistency evaluation unit 114 searches for a difference information series covering all the test input data 102 in the difference information stored in the difference information accumulation unit 113, evaluates the found difference information series under the evaluation criteria 104, and outputs the evaluation result 115. In this example, since there is only one difference information series that is stored in the difference information accumulation unit 113 and covers the input numbers 1 to 5, weights are applied to the difference information series according to the first evaluation criteria shown in 1702. The difference information and the evaluation criteria 104 applied thereto are shown below.

Apply S0→S1/0.0 for input number 1 (S0, S1, S0, 0, L5)
Apply S0→S3/0.7 for input number 2 (S0, S3, S0, 0, L1)
Apply S0→S2/0.3 for input number 3 (S0, S2, S0, 1, L5)
Apply S0→S2/0.3 for input number 4 (S0, S2, S0, 0, L3)
Apply S0→S3/0.7 for input number 5 (S0, S3, S0, 0, L2)

As for the input number 3, since the allowable output value range of the reference model 103 is not satisfied, an evaluation result thereof becomes 0.3 by multiplying the difference evaluation value 1 by an error weight 0.3 in the step 1506 of FIG. 15, and, in the step 1509, 0.06 obtained by dividing the evaluation result by 5, which is the number of input data, becomes the evaluation result 115. In this example, when output values of the test target software 101 are all within the model allowable output value range 111, the evaluation result 115 becomes 0. In the present embodiment, we assume that the user of the software test equipment finally determines pass/fail of the test when a non-zero evaluation result 115 is obtained, and the software test equipment outputs the evaluation result 115 as described above.

The test input data 102 exemplified here and output data of the test target software 101 corresponding thereto are examples for explaining the procedure of the present embodiment. According to the above sequence, a test can be performed on any test input data 102, even if output data is unknown before the test target software 101 is executed.

According to the above process, the first embodiment enables an evaluation of whether output data of the test target software 101 with respect to arbitrarily given test input data 102 satisfies requirements, under the evaluation criteria 104, thereby contributing to verification of the reliability of the test target software 101. The reference model 103 provides the basis of the reliability of the test target software 101.

Second Embodiment

In the first embodiment, an independent image is used as the test input data 102. However, in a second embodiment, a test is performed by describing an image ordered according to a time series in the reference model 103. An example of such the reference model 103 is shown in FIG. 18. Since the reference model 103 is represented by a finite state machine, the ordering is expressed by using transitions between states in the present embodiment. A state S0 refers to a start state, a state S1 refers to a state in which an object appears in a small size, a state S2 refers to a state in which the object appears in a large size after the state S1, and a state S3 refers to a state in which the object appears in an even larger size after the state S2.

1801 indicates that an object initially appears in a small size after the start state. Thereafter, the object either becomes larger 1802 or is unchanged in size 1803. In the case where the object becomes larger in 1802, the object thereafter becomes even larger 1804, is unchanged in size 1805, or becomes smaller 1806. In the case 1804 where the object became larger, the size of the object is not changed 1807 or the size becomes smaller 1808.

FIG. 19 shows an example of the evaluation criteria 104 defining error weights when output values of the test target software 101 do not satisfy the model allowable output value range 111 for such the ordered input data. Under the reference model 103, the test input data 102 not following the ordering is considered as inappropriate, and thus the software test equipment of the second embodiment terminates testing for such test input data. For example, there is no direct transition in the reference model 103 from a state S1 in which an object has appeared to a state S3 in which the object occupies half or more of an image, and the test input data 102 in which the object appears in a large size after the test input data 102 in which the object appears in a small size is determined as being inappropriate. In other words, when such the test input data 102 is given, a difference information series covering all the test input data 102 does not exist in Procedure 5 of the consistency evaluation unit 114, and thus the evaluation result 115 is not output. According to the second embodiment, there is an effect that a test target software can be tested with respect to the test input data ordered according to the time series.

Third Embodiment

FIGS. 20 and 21 are diagrams for describing a third embodiment in which a plurality of reference models 103 and a plurality of evaluation criteria 104 are input and tests of the test target software 101 are performed in parallel. FIG. 20 shows an example of input/output data in the third embodiment, wherein the input/output data includes test input data 2001, software output data 2002, first model input values 2003 for a first reference model, allowable output value range (a) 2004 for the first reference model, second model input values 2005 for a second reference model, and an allowable output value range (b) 2006 for the second reference model. In the third embodiment, in addition to the reference model 103 and the evaluation criteria of the first embodiment (hereinafter referred to as a first reference model and first evaluation criteria), a second reference model 2101 and second evaluation criteria 2102 shown in FIG. 21 are input.

From the viewpoint of a traveling direction of an object, the second reference model 2101 evaluates whether a software output value is L2 (possibly not colliding) or L4 (possibly not approaching) or L5 (unknown) when it is presumed that the object faces toward a lateral direction. In other words, with respect to the horizontal length w of the object in the image, the vertical length o of the object in the image is smaller than w/2, it is assumed that the software output data 110 is one of L2, L4, and L5, is equal to or greater than w/2, it is assumed that the software output data 110 is one of L1, L2, L3, L4, and L5. In the second reference model 2101, TO denotes a start state.

As shown in FIG. 20, in the third embodiment, the software output data 2002 is obtained for a series of the test input data 2001 and, at the same time, the allowable output value range 2004 of the first reference model and the allowable output value range 2006 of the second reference model are obtained concurrently with respect to the first and second reference models from the model execution unit 109. A difference analysis and a consistency evaluation are performed on the allowable output value range of each reference model 103. As for the first reference model, 0.06 is obtained as the evaluation result 115 as shown in the first embodiment.

If the same sequence is applied to the second reference model, since the software output data 2002 is not within the allowable output value range for fourth test input data 2001, a weight 0.5 of the second evaluation criteria is applied, and thus 0.1 is obtained as the evaluation result 115. The pass/fail of the test is determined based on the evaluation result 115 from these two different perspectives. According to the third embodiment, an evaluation result based on a plurality of reference models and a plurality of evaluation criteria can be obtained, and thus the reliability of the evaluation result can be enhanced.

Fourth Embodiment

In the present embodiment, the reference model 103 is derived from the test target software 101, thereby omitting the input of the reference model 103. Using the software test equipment of FIG. 1, the test target software 101 is tested in the following two stages.
(1) Reference Model Derivation Stage
The test input data 102 for reference model derivation and a prototype of the reference model 103 are prepared, and the reference model 103 is derived from test target software 101 under the evaluation criteria 104.
(2) Stage for Testing Test Target Software 101
Using the derived reference model 103, the test as described in the first embodiment is performed on the test target software 101.

Here, at the reference model derivation stage, in step 902 of the flowchart (FIG. 9) showing the sequence of Procedure 3 performed by the model execution unit 109, a prototype of the reference model 103 is read instead of reference model 103. In the step 1309 of the flowchart (FIG. 13) showing the sequence of the Procedure 5 performed by the consistency evaluation unit 114, instead of outputting the evaluation result 115, the allowable output value range 307 is calculated from the software output data 110 of a difference information series that minimizes the evaluation result 115, thereby deriving the reference model 103. Hereinafter, a process for deriving the reference model 103 from the test target software 101 according to the first embodiment will be described.

An example of a prototype of a reference model is shown below.

$S0=(o,h)o<h/5(L1,L2,L3,L4,L5) \rightarrow S1$ $S1= \rightarrow S0$ $S0=(o,h)h/5<=o<h/2(L1,L2,L3,L4,L5) \rightarrow S2$ $S2= \rightarrow S0$ $S0=(o,h)h/2<=o(L1,L2,L3,L4,L5) \rightarrow S3$ $S3= \rightarrow S0$ In this example, the allowable output value range in the prototype is narrowed down by using output values of the test target software 101. The evaluation criteria 104 is identical to that of FIG. 17. Also, as the test input data 102 for deriving the reference model 103, the data of the input numbers 1 to 5 in FIG. 16 is used.

The model allowable output value range 111 output by the prototype of the reference model for the five test input data 102 are as follows.

Input number 1 (S0, S1, {L1, L2, L3, L4, L5}, S0)
Input number 2 (S0, S3, {L1, L2, L3, L4, L5}, S0)
Input number 3 (S0, S2, {L1, L2, L3, L4, L5}, S0)
Input number 4 (S0, S2, {L1, L2, L3, L4, L5}, S0)
Input number 5 (S0, S3, {L1, L2, L3, L4, L5}, S0)

On the other hand, the software output data 110 includes L5, L1, L5, L3, and L2 in order of the input numbers 1 to 5 as shown in FIG. 16.

From this point, a next difference information sequence is stored in the difference information accumulation unit 113.

Input number 1 (S0, S1, S0, 0, L5)
Input number 2 (S0, S3, S0, 0, L1)
Input number 3 (S0, S2, S0, 0, L5)
Input number 4 (S0, S2, S0, 0, L3)
Input number 5 (S0, S3, S0, 0, L2)

Since this difference information series minimizes the evaluation result 115, the consistency evaluation unit 114 calculates the allowable output value range 307 of the reference model 103 from the software output data 110, thereby deriving the reference model 103. This can be done by checking the transition origin state name and the transition destination state name against the prototype of the reference model and calculating the allowable output value range 307 of the reference model from the software output data 110.

In this regard, the reference model 103 below can be derived from the test target software 101.

$S0=(o,h)o<h/5(L5)\rightarrow S1$ $S1=\rightarrow S0$ $S0=(o,h)h/5<=o<h/2(L3,L5)\rightarrow S2$ $S2=\rightarrow S0$ $S0=(o,h)h/2<=o(L1,L2)\rightarrow S3$ $S3=\rightarrow S0$ In the stage for testing the test target software 101, the derived reference model is used as the reference model 103 of FIG. 1, and the test target software 101 is tested for the new test input data 102. At this time, the test target software 101 and evaluation criteria 104 are identical to those of the reference model derivation stage. According to the fourth embodiment, since the reference model for testing can be derived based on the prototype of the reference model, for example, in the case of testing an upgraded version of the original software, an effort for creating the reference model 103 may be reduced.

Fifth Embodiment

A fifth embodiment in which some of output values of the test target software 101 are used as the model input data 2205 of the reference model via the data conversion unit 105 will be described with reference to FIGS. 22 and 23. FIG. 22 shows an example of input/output data consisting of input numbers 2201, test input data 2202, software output data 2204, model input data 2205, and allowable output value ranges 2206.

The fifth embodiment is an example of identifying handwritten numbers, and targets of identification are a four-digit number from the year 1990 to the year 2009. The output value of the test target software 101 for the test input data 2202 is one of L0:0, L1:1, L2:2, L3:3, L4:4, L5:5, L6:6, L7:7, L8:8, L9:9. A third reference model is shown in FIG. 23. The start state is denoted by S0, and, when c, which is the model input data 2205, is given, regardless of its value, the allowable output value range 2206 outputs L1 and L2, and the state is transited to a state S1 (2301). This indicates that the first number must be identified as 1 or 2.

If c in the state S1 is L1, the allowable output value range 2206 includes L9 only, and the state is transited to a state S2 (2302). If the model input data c in the state S2 is L9, the allowable output value range 2206 includes L9 only, and the state is transited to a state S3 (2303). If model input data c in the state S3 is L9, the allowable output value range 2206 includes L0 to L9, and the state is transited to a state S4 (2304). The state S4 is unconditionally transited to the state S0 (2305).

Meanwhile, when c, which is the model input data 2205 in the state S1, is L2, the allowable output value range 2206 includes L0 only, and the state is transited to a state S5 (2306). If the model input data c in the state S5 is L0, the allowable output value range 2206 includes L0 only, and the state is transited to a state S6 (2307). If the model input data c in the state S6 is L0, the allowable output value range 2206 includes L0 to L9, and the state is transited to a state S7 (2308). The state S7 is unconditionally transited to the state S0 (2309). If a software output value is not within the allowable output value range of the third reference model, an input data value of the reference model does not satisfy the transition condition in next test input data 2202, and thus the test is terminated.

At this time, there is no difference information series covering all the test input data 2202 in Procedure 5 of the consistency evaluation unit 114, and the evaluation result 115 is not output. By modifying Procedure 5, the evaluation result 115 on the difference information series until the termination of the test can be output.

FIG. 22 shows the outline of the test according to the fifth embodiment for the test input data 2202 including four handwritten numbers. First, for the test input data 2202 of the input number 1, the data conversion unit 105 generates a dummy input data value indicating the start of the test and sends the dummy input data value to the model execution unit 109, thereby transiting the state of a model from S0 to S1 and obtaining allowable output value ranges L1 and L2. On the other hand, the software execution unit 107 obtains L1 as the software output data 2204 for the test input data 2202 of the input number 1. Thereafter, the data conversion unit 105 uses the software output data 2204 as the model input data 2205 of the reference model 103.

In other words, regarding the test input data 2202 of the input number 2, the model input data 2205 of the reference model 103 is L1, and the allowable output value range L9 is obtained from the reference model 103. If the software output data 2204 regarding test input data 2202 of input number 2 is L9, the software output data 2204 is within the allowable output value range. This software output data 2204 is used as the model input data 2205 of the reference model 103 for the test input data 2202 of the input number 3. In this regard, if all of the four handwritten numbers are within the allowable output value range, 0 is obtained as the evaluation result 115 based on the evaluation criteria 104.

In the present embodiment, the software output data 110 of FIG. 1 is passed to the data conversion unit 105 to create the model input data 108. On the other hand, the information of the test input data 102 is not used for creating the model input data 108 except for the first dummy data indicating the start of a test. According to the fifth embodiment, when it is difficult to directly create the model input data 108 from the test input data 102, the test target software 101 can be used as a means for creating the model input data 108.

Sixth Embodiment

An embodiment in which difference information accumulated in the difference information accumulation unit 113 is analyzed and used as test input data will be described as a sixth embodiment. FIG. 24 shows an example of the input/output data in the sixth embodiment, which includes input numbers 2401, test input data 2402, software input data 2403, software output data 2404, model input data 2405, and allowable output value ranges 2406. In the first embodiment, after the tests on the test input data 2402 from the input number 1 to the input number 5 are completed, difference information is analyzed, and thus the software output data 2404 corresponding to the test input data 2402 of the input number 3 is found to be out of the allowable output value range 2406.

Therefore, in the sixth embodiment, in order to perform concentrated tests mainly to the input number 3, test input data 310, 312, and 313 obtained by slightly modifying the input data of the input number 3 are generated through the consistency evaluation unit 114 and are added to the test input data 102 as additional input data. FIG. 24 shows an example of performing image enlargements (input numbers 310 and 312) and image reduction (input number 311) on test input data of the input number 3. According to the sixth embodiment, for test input data outside the allowable output value range 2406, test input data can be added. Therefore, test input data outside the allowable output value range can be profoundly tested.

What is claimed is:

1. Software test equipment, which, by a computer, receives a test input data to test a test target software and evaluates a behavior of the test target software based on a software output data from the test target software, the software test equipment comprising:
    a processor in communication with the computer, the processor comprising:
        a data conversion unit;
        a software execution unit;
        a model execution unit;
        a reference model;
            the data conversion unit configured to receive the test input data to convert it into a software input data to be provided to the software execution unit, and the data conversion unit further configured to receive the test input data to convert it into a model input data to be provided to the model execution unit;
            the software execution unit configured to receive the software input data from the data conversion unit, execute the test target software based on the software input data, and output a software output data execution result;
            the model execution unit configured to receive the reference model for the test target software to generate a model allowable output value range representing an allowable output value range of the execution result obtained by the software execution unit, based on the model input data and the reference model;
            the reference model derived from the test target software and based on a prototype of the reference model thereby omitting an input of the reference model and whereby an effort for creating the reference model may be reduced;
        a difference analysis unit configured to generate difference information based on the execution result output by the software execution unit and the model allowable output value range generated by the model execution unit;
        a difference information accumulation unit configured to receive and store the difference information generated by the difference analysis unit, and
        a consistency evaluation unit configured to receive evaluation criteria and evaluate the behavior of the test target software based on the difference information of the difference information accumulation unit and the evaluation criteria, the evaluation criteria comprising at least one weight designation including a transition origin state name, a transition destination state name, and an error weight measured by an amount of a numerical value,
    wherein the transition origin state name and the transition destination state name of a selected difference information are checked against the evaluation criteria to obtain the error weight, and the error weight is applied to a difference evaluation value of the selected difference information and the difference evaluation value is added to an evaluation by the consistency evaluation unit,
    wherein when the execution result obtained by the software execution unit does not satisfy the model allowable output value range, an evaluation result by the consistency evaluation unit is determined by multiplying the difference evaluation value by the error weight,
    wherein the test target software is software whose output data with respect to input data has unpredictability, and thus it is not possible to determine output data before the software is executed, and
    wherein, in a case of performing a plurality of tests at a same time on a same test target software and on a same test input data, the software test equipment comprises a plurality of model execution units, a plurality of difference analysis units, a plurality of consistency evaluation units, and a plurality of reference models.

2. The software test equipment according to claim 1, wherein
    the test input data is data ordered in a time series,
    an ordering is described in the form of transitions between states in the reference model, and
    the difference analysis unit generates the difference information based on the execution result output by the software execution unit and the model allowable output value range according to the order of the test input data.

3. The software test equipment according to claim 1, wherein
    in the reference model, a current state name, the model input data, a transition condition, an output value range of the execution result, and a next state name in a case where the transition condition is satisfied are described, and the output value range is an allowable or a forbidden output value range of the execution result obtained by executing the software,
    the model execution unit generates the model allowable output value range based on the current state name and the next state name when the transition condition in the reference model is satisfied with respect to the model input data, and
    the difference analysis unit generates the difference information based on the model allowable output value range and the execution result obtained by executing the software.

4. The software test equipment according to claim 1, wherein the reference model includes a first reference model and a second reference model, the evaluation criteria includes first evaluation criteria and second evaluation criteria, and the evaluation unit outputs a first evaluation result based on the first reference model and the first evaluation criteria and a second evaluation result based on the second reference model and the second evaluation criteria.

5. The software test equipment according to claim 1, wherein the model execution unit generates a first model allowable output value range based on a first reference model and a first input data, the difference analysis unit generates a difference information with respect to the first test input data based on the execution result output by the software execution unit and the first model allowable output value range, the evaluation unit calculates a updated model allowable output value range with respect to the first test input data based on the difference information and first evaluation criteria, thereby deriving a second reference model including the updated model allowable output value range, the model execution unit generates a second model allowable output value range based on the second reference model and the second input data, the difference analysis unit generates second difference information based on the execution result output by the software execution unit with respect to the second input data and the second model allowable output value range, and the evaluation unit evaluates a behavior of the software based on the second difference information and the first evaluation criteria.

6. The software test equipment according to claim 1, wherein the execution result output by the software execution unit is used as the model input data.

7. The software test equipment according to claim 1, wherein when the execution result output by the software execution unit is outside the allowable output value range, the evaluation unit generates new test input data based on the test input data for which execution output is outside the allowable output value range.

8. A software testing method, which, by a computer, provides a software input data to test a test target software and evaluates a behavior of the test target software based on a software output data from the test target software, the software testing method comprising:

receiving test input data to generate the software input data to be provided to the software and model input data from the test input data;

receiving the software input data and executing the test target software based on the software input data to output a software output data execution result;

receiving a reference model for the software to generate a model allowable output value range of the execution result, based on the model input data and the reference model; the reference model derived from the test target software and based on a prototype of the reference model thereby omitting an input of the reference model and whereby an effort for creating the reference model may be reduced;

generating difference information based on the execution result and the model allowable output value range;

storing the difference information to be evaluated based on an evaluation criteria, the evaluation criteria comprising at least one weight designation including a transition origin state name, a transition destination state name, and an error weight measured by an amount of a numerical value; and receiving the evaluation criteria to evaluate a behavior of the software based on the difference information and the evaluation criteria, wherein the transition origin state name and the transition destination state name of a selected difference information are checked against the evaluation criteria to obtain the error weight, and the error weight is applied to a difference evaluation value of the selected difference information and the difference evaluation value is added to an evaluation by the consistency evaluation unit, wherein when the execution result obtained by the software execution unit does not satisfy the model allowable output value range, an evaluation result by the consistency evaluation unit is determined by multiplying the difference evaluation value by the error weight, wherein the test target software is software whose output data with respect to input data has unpredictability, and thus it is not possible to determine output data before the software is executed, and wherein, in a case of performing a plurality of tests at a same time on a same test target software and on a same test input data, the software test equipment comprises a plurality of model execution units, a plurality of difference analysis units, a plurality of consistency evaluation units, and a plurality of reference models.

9. The software testing method according to claim 8, further comprising:

receiving a first reference model to generate a first model allowable output value range based on first model input data and the first reference model;

generating first difference information based on the software execution result and the first model allowable output value range;

receiving first evaluation criteria to make a first evaluation based on the first difference information and the first evaluation criteria;

receiving a second reference model to generate a second model allowable output value range based on the first model input data and the second reference model;

generating second difference information based on the software execution result and the second model allowable output value range; and receiving second evaluation criteria to make a second evaluation based on the second difference information and the second evaluation criteria.

10. The software testing method according to claim 8, further comprising:

generating a first model allowable output value range based on a first reference model and a first input data;

generating a difference information with respect to the first test input data based on the software execution result and the first model allowable output value range;

calculating an updated model allowable output value range with respect to the first test input data based on the difference information and first evaluation criteria to derive a second reference model including the updated model allowable output value range;

generating a second model allowable output value range based on the second reference model and a second input data; and generating second difference information based on the software execution result with respect to the second input data and the second model allowable output value range and receiving the evaluation criteria to evaluate a behavior of the software based on the second difference information and the evaluation criteria.

11. The software testing method according to claim 8, further comprising:
generating additional data to the test input data when the execution result is outside the allowable output value range.

\* \* \* \* \*